United States Patent [19]

Clarke

[11] Patent Number: 4,874,903

[45] Date of Patent: Oct. 17, 1989

[54] SHIELDING PANEL

[75] Inventor: Leslie T. Clarke, Merseyside, England

[73] Assignee: Pilkington PLC, Merseyside, England

[21] Appl. No.: 199,715

[22] Filed: May 27, 1988

[30] Foreign Application Priority Data

Jun. 9, 1987 [GB] United Kingdom ............... 8713437

[51] Int. Cl.⁴ .............................................. H05K 9/00
[52] U.S. Cl. ................................ 174/35 MS; 358/245
[58] Field of Search ....................... 174/35 R, 35 MS; 219/10.55 D

[56] References Cited

U.S. PATENT DOCUMENTS

| 2,920,174 | 1/1960 | Haagensen | 174/35 MS |
| 3,260,832 | 7/1966 | Johnson | 219/10.55 D |
| 3,604,783 | 9/1971 | Roth | 219/10.55 DX |
| 4,412,255 | 10/1983 | Kuhlman et al. | 174/35 MS X |
| 4,447,492 | 5/1984 | McKaveney | 174/35 MS X |
| 4,670,347 | 6/1987 | Lasik et al. | 174/35 MSX |
| 4,758,686 | 7/1988 | Takahashi et al. | 174/35 MS |
| 4,760,456 | 7/1988 | Liang | 174/35 MS X |

FOREIGN PATENT DOCUMENTS

| 0059063 | 9/1982 | European Pat. Off. | |
| 207181 | 6/1985 | European Pat. Off. | 174/35 MS |
| 0226151 | 6/1987 | European Pat. Off. | |
| 2111108 | 6/1972 | France | |
| 915518 | 1/1963 | United Kingdom | 174/35 MS |
| 1336825 | 11/1973 | United Kingdom | |
| 1364712 | 8/1974 | United Kingdom | |
| 2129831 | 5/1984 | United Kingdom | 174/35 MS |

Primary Examiner—Morris H. Nimmo
Attorney, Agent, or Firm—Burns, Doane, Swecker & Mathis

[57] ABSTRACT

This invention relates to translucent electromagnetic shielding panels, that is translucent panels for shielding against electromagnetic interference or eavesdropping, which incorporate silver coatings to attenuate electromagnetic radiation. Such panels may be used, for example, for glazing the windows of buildings, serving as viewing panels in enclosures for housing electronic equipment, for instance, in electronic apparatus rack-scubicles, and serving as viewing windows in front of electronic apparatus such as v.d.u.'s (visual display units). The panel of the invention includes at least one pane of glass or plastics and two silver layers each up to 30 nm thick whereby the panel has a lower reflection for visible light than a panel having a single thicker layer of silver having an equivalent electromagnetic shielding effect. The panel may be laminated having an interlayer and has electrical connection means for providing an electrical conductive path from the silver coatings to earth.

15 Claims, 1 Drawing Sheet

SHIELDING PANEL

BACKGROUND OF THE INVENTION

The invention relates to translucent electromagnetic shielding panels, that is translucent panels for shielding against electromagnetic interference or eavesdropping, which incorporate silver coatings to attenuate electromagnetic radiation.

It is known to use coatings comprising thin silver layers on glass or plastics substrates to reflect infra red radiation, or to carry an electric current which heats the coated substrate, for example to demist the substrate. It has also been proposed to use the coated panes, with the silver layer electrically connected to earth all around the periphery of the pane, as an electromagnetic shielding panel to inhibit the transmission of electromagnetic radiation; in particular, to inhibit the entry of extraneous electromagnetic radiation liable to interfere with the operation of electric equipment behind the pane, and the escape of electromagnetic radiation carrying sensitive information from electrical equipment such as computers and word processors behind the pane, while allowing the passage of visible light through the pane. Such coatings are usually used for shielding against electromagnetic radiation having a frequency in the range 20 MHz to 10000 MHz.

In general, the thicker the silver layer, the greater the attenuating effect of the coating. However, as the thickness of the silver layer is increased, the visible light reflection of the coating also increases and the light transmission of the coating falls. It would be desirable to produce an electromagnetic shielding panel having a lower reflection, and preferably a higher light transmission, for a given electromagnetic shielding effect than is obtained using known silver coatings.

EP-A 0 207 181 relates to laminated safety glass with dual heat reflecting layers. It is concerned with the problem of duplicated virtual images ("ghost images") which appear when a pane carrying a highly reflecting layer is formed into a laminate. According to the invention, the problem is overcome by incorporating two heat reflecting layers into the laminate, one on each side of the interlayer. According to EP-A 0 207 181, the heat reflecting layer preferably has a thickness of at least 40 nm and is made of a material selected from gold, silver, palladium, nickel, chromium, aluminium, titanium and oxides thereof. The patent specification is particularly concerned with laminates with a thickened interlayer to prevent shattering and, while it refers to an interlayer thickness of 0.1 mm to 50 mm, the problem of "ghost images" only becomes at all significant at interlayer thicknesses of 1 mm or more and with highly reflecting thick coatings.

UK 915 518 describes the use of a plastic radiation screen behind a window, the screen carrying a coating of metal, for example gold, platinum or nickel, to control the passage of visible light while almost completely reflecting the long wave infra red radiation of 300° K. In one embodiment, two identical radiation screens are stuck to one another on their metal coated sides by an adhesive permeable to light. The use of the two screens is said to provide the additional effect that radiation falling on the screen on the room side will be reflected back into the room.

It has now been found that an electromagnetic shielding panel of reduced light reflection for a given electromagnetic attenuation may be obtained by using two separate relatively thin silver layers in place of a single thicker silver layer.

SUMMARY OF THE INVENTION

According to present invention, there is provided a translucent electromagnetic shielding panel including at least one pane of glass or plastics and two silver layers each up to 30 nm thick, whereby the panel has a lower reflection for visible light than a panel having a single thicker layer of silver having an equivalent electromagnetic shielding effect.

The panel preferably comprises two opposed spaced panes each of glass or plastics and each carrying a silver layer. Preferably each pane carries the silver layer on its surface which faces the other pane. The panes are laminated together by an interlayer between them or simply spaced apart with an air (or other gas) space between them. When an interlayer is used between the panes to form the laminate, it will usually have a thickness of less than 0.8 mm, although the thickness may be increased up to 11 mm in circumstances when it is required to obtain a degree of absorption of electromagnetic radiation by the interlayer.

Each silver layer is preferably sandwiched between two anti-reflection layers.

When using thinner silver layers, especially silver layers less than about 10 nm thick, not only is the light reflection reduced, but the light transmission of the panel is increased as compared to a panel having a single thicker layer of silver having an equivalent electromagnetic shielding effect.

According to a further aspect of the invention there is provided a method of reducing the transmission of electromagnetic radiation having a frequency in the range 20 to 10000 MHz comprising incorporating a panel according to the invention in the path of said radiation with the coatings electrically connected to earth around the periphery of the panel by electrical connection means.

The invention is illustrated but not limited by the following description with reference to the accompanying drawings in which

DESCRIPTION OF PREFERRED EMBODIMENT

Figure 1:
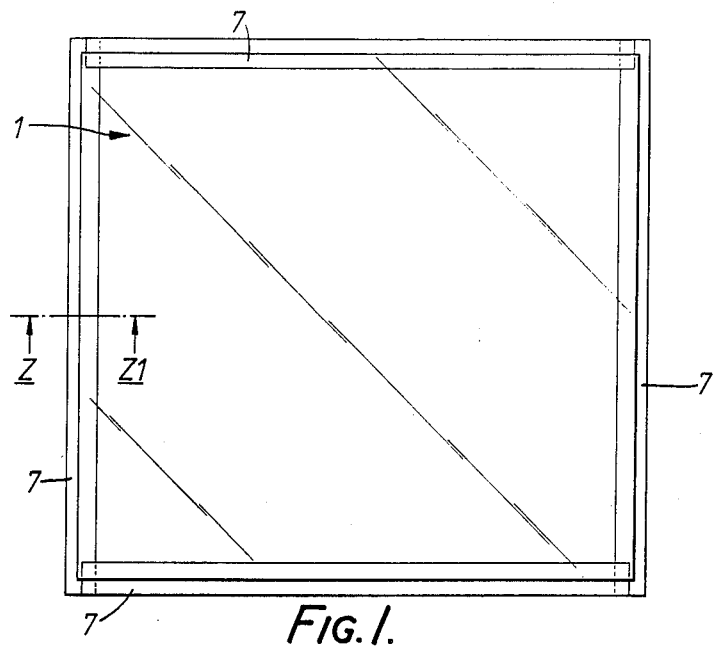
FIG. 1 is a plan view of a panel in accordance with the invention.
Figure 2:
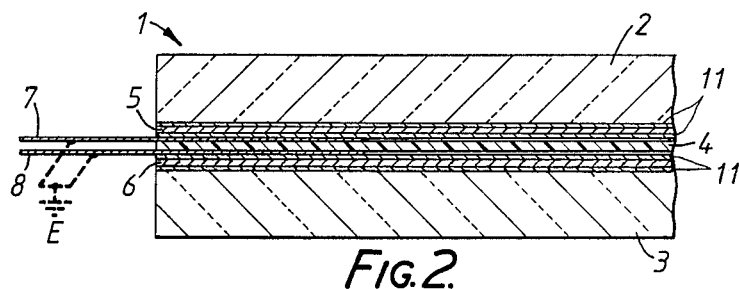
FIG. 2 is a sectional view on the line Z–Z1 of the panel of FIG. 1, with the coating layers increased in thickness for clarity.
Figure 3:
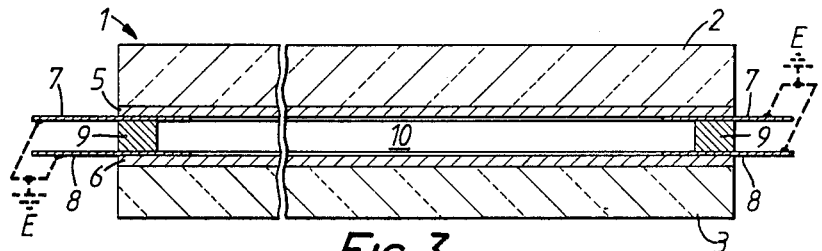
FIG. 3 is a sectional view of a panel in accordance with the invention incorporating an air space.

Referring to FIGS. 1, 2 and 3, a translucent electromagnetic shielding panel generally designated 1 comprises two panes of clear glass 2,3 laminated together by an interlayer 4. Each of the panes carries a coating 5,6 on its major surface which faces the interlayer. The coatings 5,6 each comprise a central silver layer up to 30 nm thick sandwiched between two anti-reflection layers 11 (shown only in FIG. 2). The anti-reflection layers may be layers of metal ox examples of metal oxide which may be used include titanium oxide, tin oxide, indium tin oxide, zinc oxide and bismuth oxide. The anti-reflection layers will generally have a thickness in the range 20 nm to 60 nm, the thicknesses in any particular case being optimised having regard to the thickness of the silver layer to provide, so far as possible, the desired optical properties (for example, high light transmission, neutral colour).

Borders 7,8 of fine electrically conductive mesh are incorporated between each of the coatings 5,6 and the interlayer in contact with the coatings all around the periphery of the panel and extending beyond the edge of the panel in order to make electrical contact with the silver coatings, for example in order to connect the coatings to earth. The electroconductive mesh is a fine mesh in order to ensure a uniform electrical potential over the whole border of the coated pane; it preferably has a mesh size of less than 5 mm, and is of metal wire. The width of the border formed by the electroconductive mesh overlapping the coated pane is not critical providing it is sufficient to achieve satisfactory electrical contact with the eltroconductive coating; it will usually be at least 5 mm wide, but not more than 25 mm wide.

The panels of the invention may be produced by laminating together the panes of coated glass or plastics with an interlayer. The interlayer is conveniently of polyvinylbutyral but other interlayer materials (for example polyurethane, and 'cast-in-place' acrylic resins which cure in situ between the panes) may be used if desired. For most applications, an interlayer thickness of less than 0.8 mm is satisfactory and preferred for reasons of cost. However, in certain circumstances this interlayer thickness is increased up to 11 mm when it is required to obtain a degree of absorption of electromagnetic radiation passing through the interlayer. The panes may be coated by magnetically enhanced sputtering, for example as described in GB No. 2 129 831B, and cut to size. The borders of conductive mesh are formed by providing strips of wire mesh along the four edges of each of the panes so that they overlap at the corners when the laminate is being made up. They will usually become embedded in the interlayer during the laminating process. The mesh is used to make a mechanical electrical connection from all around the silver coatings and provide an electrically conductive path to earth E as illustrated in FIG. 2 and FIG. 3. The invention is illustrated but not limited by the following Examples which illustrate the advantages of the invention over the use of single thicker silver layers.

Example 1

A panel as illustrated in FIGS. 1 and 2 of the accompanying drawings comprises two panes of clear 3 mm float glass each carrying a coating comprising a layer of silver sandwiched between two anti-reflection tin oxide layers made by the process described in UK 2 129 831B using a thin layer of aluminium between the silver layer and the overlying metal oxide layer. The silver layer was approximately 8.5 nm thick giving a sheet resistance of 10 ohms per square. The panes were laminated together by autoclaving using a polyvinylbutyral interlayer 0.38 mm thick and borders of WRAPSHIELD knitted wire mesh (available in commerce from RFI Shielding Limited of Braintree, Essex, England) between the interlayer and each of the coated glass surfaces.

The light reflection and transmission of the resultant laminates were measured using a CIE Illuminant C source, and the attenuation of the panel to the transmission of electromagnetic radiation through the panel in a direction normal to the panel surface was determined over the frequency range 20 to 10000 MHz. The results obtained were as follows:

Light reflection: 9%
Light transmission: 75%
Shielding Effectiveness: 26 dB

The light reflection and light transmission of a similar laminate with a similar coating of increased silver thickness on one pane only (the other pane being of uncoated clear glass) was estimated from graphs of (a) attenuation against frequency for silver layers of different sheet resistance
and (b) light reflection and transmission against sheet resistance of the silver layer for laminates as described with reference to the drawings, but with one coated glass pane and one clear glass pane.

The light reflection and light transmission of such a laminate having a shielding effectiveness of 26 dB were estimated as Light reflection: 15%
Light transmission: 72%

There it will be seen that by using a panel comprising two coated panes each incorporating a silver layer, a product with a lower light reflection (9% as opposed to 15%) and higher light transmission (75% as opposed to 72%) can be achieved than using a comparable laminate having the same electromagnetic shielding effectiveness derived from a single coating including a single layer of silver of increased thickness.

EXAMPLE 2

The procedure of Example 1 was repeated to compare the light reflection and transmission of a laminate of two panes of coated glass (each coating including a silver layer having a sheet resistance of 5 ohms per square - corresponding to a thickness of 13 nm silver - sandwiched between tin oxide anti-reflection layers), with a similar laminate of similar shielding effectiveness (31 dB) of one pane of uncoated glass and one pane of coated glass, the coating incorporating a thicker silver layer. The results obtained were:

|  | Laminate of two coated panes | Laminate with single coated pane |
| --- | --- | --- |
| Light reflection | 19% | 25% |
| Light transmission | 61% | 63% |

In this case it will be seen that a marked reduction in reflection (from 25% to 19%) is achieved by using two silver coatings, at the cost of a small loss in light transmission (61% compared to 63%). However, this loss in transmission can be readily tolerated in view of the substantial reduction in light reflection which is achieved.

It has been found that similar beneficial results, with an even lower light reflection, are achieved using two panes of the coated glass with an air space between them. A sectional view of such a panel 1 is shown in FIG. 3, where corresponding components of the panel shown in FIG. 1 and FIG. 2 are identically designated. The difference between the panel shown in FIG. 3 and that of FIG. 1 and FIG. 2 is that the panel incorporates an air space 10 instead of an interlayer 4. This air space 10 is defined by a spacer means 9 which is located between the panes 5 and 6 and which extends all around the periphery of the panel. The borders of fine electrically conductive mesh 7 and 8 are trapped between the spacer means 9 and the coatings 5 and 6 respectively all around the periphery of the panel.

Panels in accordance with the invention may be used, for example, for glazing the windows of buildings, serving as viewing panels in enclosures for housing electronic equipment, for instance, in electronic apparatus racks/cubicles, and serving as viewing windows in front of electronic apparatus such as v.d.u.'s (visual display units).

Although this invention envisages a mechanical electrical connection means comprising a fine wire mesh all around the edges of the panel, alternative electrical connection arrangements may be employed for making an electrical connection from the silver coatings.

For instance, either by employing a mechanical connection in the form of a sprayed-on contact as disclosed in our co-pending UK application No. 88 03814 or by employing the arrangement of an inherent capacitive connection from the silver coatings as disclosed in our co-pending UK application No. 88 02401.

What is claimed is:

1. A translucent electromagnetic shielding panel comprising, in combination,
    a first pane of glass or plastic carrying a silver layer on one of its major surfaces, the thickness of the silver layer being up to 30 nm,
    a second pane of glass or plastic carrying a silver layer on one of its major surfaces, the thickness of the silver layer being up to 30 nm, with the first and second said panes being positioned in an opposed, spaced relationship,
    and first and second electrical connection means in contact with the periphery of the silver layers on each of said respective first and second panes for providing an electrical connection of the silver layers to earth.

2. A panel according to claim 1, wherein the panes are laminated together by means of an interlayer between said panes.

3. A panel according to claim 2, wherein said interlayer is less than 0.8 mm thick.

4. A panel according to claim 2, wherein said interlayer is between 0.8 mm and 11 mm thick.

5. A panel according to claim 2, wherein each of said panes is positioned with the silver layer carried thereby facing the said interlayer.

6. A panel according to claim 5, wherein said interlayer is less than 0.8 mm thick.

7. A panel according to claim 5, wherein said interlayer is between 0.8 mm and 11 mm thick.

8. A panel according to claim 1, wherein each of said silver layers is sandwiched between two anti-reflection layers.

9. A panel according to claim 2, wherein each of said silver layers is sandwiched between two anti-reflection layers.

10. A panel according to claim 5, wherein each of said silver layers is sandwiched between two anti-reflection layers.

11. A panel according to claim 1, wherein each of said silver layers is up to 10 nm thick.

12. A panel according to claim 1, wherein each of the first and second electrical connection means is in contact with the entire peripheral region of the silver layer on the respective first and second panels.

13. A translucent electromagnetic shielding panel comprising, in combination,
    a first pane of glass or plastic carrying a silver layer on one of its major surfaces, the thickness of the silver layer being up to 30 nm, and the silver layer being sandwiched between two anti-reflection layers,
    a second pane of glass or plastic carrying a silver layer on one of its major surfaces, the thickness of the silver layer being up to 30 nm, and the silver layer being sandwiched between two anti-reflection layers, with the first and second said panes being positioned opposed, spaced relationship,
    and first and second electrical connection means contact with the periphery of the silver layers one each of said respective first and second panes for providing an electrical connection of the silver layers to earth.

14. A translucent electromagnetic shielding panel comprising, in combination,
    a first pane of glass or plastic carrying a silver layer on one of its major surfaces, the thickness of the silver layer being up to 30 nm, and the silver layer being sandwiched between two anti-reflection layers,
    a second pane of glass or plastic carrying a silver layer on one of its major surfaces, the thickness of the silver layer being up to 30 nm, and the silver layer being sandwiched between two anti-reflection layers, with the first and second said panes being positioned in an opposed, spaced relationship, with an air space between them,
    and first and second electrical connection means in contact with the periphery of the silver layers on each of said respective first and second panes for providing an electrical connection of the silver layers to earth.

15. A translucent electromagnetic shielding panel comprising, in combination,
    a first pane of glass or plastic carrying a silver layer on one of its major surfaces, the thickness of the silver layer being up to 30 nm and the silver layer being sandwiched between two anti-reflection layers,
    a second pane of glass or plastic carrying a silver layer on one of its major surfaces, the thickness of the silver layer being up to 30 nm, and the silver layer being sandwiched between two anti-reflection layers, with the first and second said panes being laminated together in an opposed, spaced relationship, by means of an interlayer between said first and second panes,
    and first and second electrical connection means in contact with the periphery of the silver layers on each of said respective first and second panes for providing an electrical connections of the silver layers to earth.

* * * * *